(12) United States Patent
Masser

(10) Patent No.: US 8,782,810 B2
(45) Date of Patent: Jul. 15, 2014

(54) SCANNING PROBE MICROSCOPE HAVING SUPPORT STAGE INCORPORATING A KINEMATIC FLEXURE ARRANGEMENT

(75) Inventor: Carl Masser, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 11 days.

(21) Appl. No.: 12/915,441

(22) Filed: Oct. 29, 2010

(65) Prior Publication Data

US 2011/0107471 A1    May 5, 2011

Related U.S. Application Data

(60) Provisional application No. 61/256,073, filed on Oct. 29, 2009.

(51) Int. Cl.
*G01Q 10/00* (2010.01)
*G01Q 10/04* (2010.01)
*G01Q 10/06* (2010.01)
*B82Y 35/00* (2011.01)

(52) U.S. Cl.
CPC ............... *B82Y 35/00* (2013.01); *G01Q 10/04* (2013.01); *G01Q 10/065* (2013.01)
USPC ................................................. 850/1; 850/8

(58) Field of Classification Search
None
See application file for complete search history.

(56) References Cited

U.S. PATENT DOCUMENTS

| | | | |
|---|---|---|---|
| 5,198,715 A | 3/1993 | Elings et al. | |
| 5,306,919 A | 4/1994 | Elings et al. | |
| 5,469,734 A | 11/1995 | Schuman | |
| 5,641,897 A | 6/1997 | Schuman | |
| 6,246,054 B1 | 6/2001 | Toda et al. | |
| 7,044,007 B2 | 5/2006 | Struckmeier et al. | |
| 7,278,297 B2 | 10/2007 | Bauza et al. | |
| 7,448,798 B1 | 11/2008 | Wang | |
| 2004/0079142 A1* | 4/2004 | Proksch | 73/105 |
| 2006/0097162 A1* | 5/2006 | Maruyama et al. | 250/309 |
| 2007/0067140 A1 | 3/2007 | Jain et al. | |
| 2008/0011064 A1 | 1/2008 | Masser et al. | |
| 2008/0202222 A1 | 8/2008 | Woody et al. | |

FOREIGN PATENT DOCUMENTS

CN    101458203 A    6/2009
JP    2001296229 A    10/2001

OTHER PUBLICATIONS

International Search Report and Written Opinion from PCT/US2010/054691, Dated Jul. 6, 2011.
Chinese Search Report Dated Jan. 22, 2014 for Chinese Patent Application Serial No. 201080055160.6.

* cited by examiner

*Primary Examiner* — Nicole Ippolito
*Assistant Examiner* — Hanway Chang
(74) *Attorney, Agent, or Firm* — Boyle Fredrickson, S.C.

(57) ABSTRACT

A scanning probe microscope (SPM) has a piezoelectric actuator-based tube scanner to which a probe is attached and which is moveable in three planes by the application of a voltage to the piezoelectric tube. A set of flexures flex with the displacement of the tube and strain gauges attached to the flexures measure the flex of the flexures to provide feedback as to the displacement of the tube during the scanning of an object. The strain gauges and flexures form a kinematic sensing frame or arrangement in which a single constraint is provided for each degree of freedom and in which the constraints are at least substantially orthogonal to one another.

19 Claims, 5 Drawing Sheets

SCANNING PROBE MICROSCOPE HAVING SUPPORT STAGE INCORPORATING A KINEMATIC FLEXURE ARRANGEMENT

CROSS-REFERENCE TO A RELATED APPLICATION

The present application claims the benefit of U.S. Ser. No. 61/256,073, filed Oct. 29, 2010, the disclosure of which is incorporated herein in its entirety.

FIELD OF THE INVENTION

The present invention relates generally to microscopy and, more particularly, to an electromechanical scanning device, such as a scanning probe microscope (SPM), having an apparatus that measures the displacement of the scanning device during scanning of a sample.

BACKGROUND OF THE INVENTION

Electromechanical scanning devices, such as SPMs and force scanning probe microscopes (FSPM), are commonly used to generate an image of a characteristic or sample using a probe that scans or otherwise interacts with the sample. A scanner moves the probe and/or sample relative to one another in a horizontal or X-Y plane to position the probe at a desired location on the sample, and the probe and/or sample are moved relative to one another in a vertical or Z direction to take the measurement. The scanner may position the probe at one or more discrete positions on the sample surface to take the desired measurement(s) or may move the probe back and forth across the sample in a pattern commonly known as raster scan. The probe is moved relative to the sample in some instruments, while the sample is moved relative to the probe in other instruments. In still others, the scanner includes separate actuators for translating both the probe and the sample. For example, in some instruments, an X-Y actuator translates the sample relative to the probe, while a Z actuator translates the probe relative to the sample. The scanner is typically mounted in or on a scan head or stage that supports the scanner and occasionally other devices such as components of an optical microscope. The interactions between the sample and the probe are recorded as a function of the position of the probe, and these recorded interactions are used to capture data representative of a portion of the sample.

Since the interactions of the probe and the sample are recorded as a function of the position of the probe, the position of the probe must be also be precisely known during each sampling of the sample. When imaging on the atomic and subatomic scale, the displacement between each sampling position is extremely small and, as such, highly accurate knowledge of the position of the probe is required.

Some SPMs use open loop control to position a probe at the desired location on the sample, using the voltage supplied to scanner(s) of the SPM to determine the location of the probe with respect to the sample. Others replace or supplement this open loop control with a closed loop control that utilizes scanner displacement measurements. While a number of sensors and measurement techniques have been developed to precisely measure the displacement of the probe during the scanning of a sample, these sensors suffer from a number of drawbacks. For instance, many sensors have been found to lack the necessary sensitivity for atomic and subatomic probes, are unduly large or have a limited sensing range, or are highly susceptible to interference that can negatively impact the precision of the displacement measurements.

Thus, there remains a need in the art for an apparatus that provides highly precise measurements of the displacement of the probe of an electromechanical scanning device during the scanning of a sample.

SUMMARY OF THE INVENTION

Briefly and in general terms, an electromechanical scanning device according to one aspect of the invention includes a sensor arrangement that is capable of sensing displacement of a SPM scanner in at least two, and preferably three, mutually orthogonal dimensions. The preferred sensor arrangement is capable of measuring or sensing the displacement of the scanner with relatively high bandwidth, e.g., 10 kHz, and relatively low noise, e.g., less than 1 nm. The sensor arrangement is believed to be relatively compact and with a low power dissipation, e.g., less than 10 mW.

In accordance with one aspect of the invention, a scanning probe microscope is provided that includes a scanner having a piezoelectric actuator adapted to move in a first or X direction and a second or Y direction. The scanning microscope further has a first sensor and a second sensor configured to sense displacement of the actuator in the first and the second directions, respectively. The first and second sensors provide separate output signals that are decoupled from one another so that each sensor provides information regarding the displacement of the actuator in a particular direction while remaining insensitive to displacement in another direction.

In accordance with another aspect of the invention, a SPM has a scanner extending from an opening in the header of a scan head and movable in the X, Y, and Z directions in response to a voltage applied to the tube. The scan head additionally includes a sensor-mounting arrangement including a base to which a working end of the scanner is coupled. The base is configured to flex in response to displacement of the scanner in the Z direction. A rod is coupled to the base and extends upward from the base generally adjacent to yet spaced from the scanner. The rod flexes in response to displacement of the actuator in the X or Y directions. An arrangement of strain gauges independently measure displacement of the scanner in the X, Y, and Z directions. The actuator preferably comprises a piezoelectric element, and more preferably a piezoelectric tube.

The resulting structure provides a kinematic sensing frame or arrangement in which a single constraint is provided for each degree of freedom and in which the constraints are at least substantially orthogonal to one another (i.e. nondegenerate).

In accordance with yet another aspect of the invention, a method of operating an SPM is provided that includes selectively energizing a piezoelectric tube scanner to translate a working end of the tube scanner in substantially mutually orthogonal X, Y, and Z directions. The method further includes monitoring movement of the working end of the tube using a sensor mounting arrangement that is mechanically decoupled from the tube actuator assembly. The monitoring includes translating movement of the working end of the tube scanner into movement of a sensor mounting arrangement coupled thereto. Using flexures, movement is concentrated in portions of the sensor mounting arrangement on which each of an X-axis sensor, a Y-axis sensor, and a Z-axis sensor are mounted to the X direction, the Y direction, and the Z direction, respectively. Movement of the working end of the tube scanner is directly monitored in the X, Y, and Z directions using the X-axis sensor, the Y-axis sensor, and the Z-axis sensor, respectively.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE INVENTION

FIGS. 1-5 show a stage or scan head 10 according to one embodiment of the invention. The scan head 10 forms part of a SPM in the form of an atomic force microscope (AFM) 200 (FIG. 1) that is well-suited for scanning and imaging of objects in the atomic and subatomic scale. It is understood, however, that the scan head 10, and other scan heads falling within the scope of the appended claims, may be used with other instruments as well.

Figure 1:
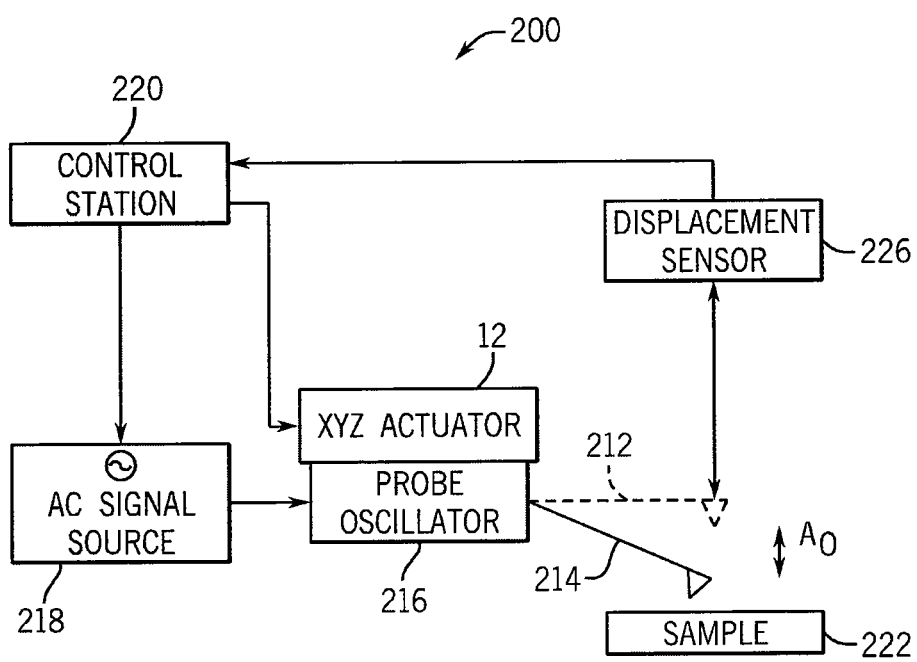
FIG. 1 schematically illustrates an AFM incorporating a stage or scan head constructed in accordance with a preferred embodiment of the invention.

Referring to FIG. 1, AFM 200 of this embodiment includes, among other components, an actuator assembly, XYZ actuator assembly or scanner 112, and a control station 220. The scanner 112 is mounted over a sample 222 and bears a probe 212 on its lower, moving end. Probe 212 has a cantilever 214 and a tip mounted on the free end portion of the cantilever 214. The probe 212 is coupled to an oscillating actuator or drive 216 that is used to drive probe 212 to oscillate, in this case, at or near the probe's resonant frequency. Commonly, an electronic signal is applied from an AC signal source 218 under control of an AFM control station 220 to the drive 216 to oscillate probe 212, preferably at a free oscillation amplitude $A_o$.

Control station 220 typically consists of at least one computer and associated electronics and software that perform the tasks of data acquisition and control of the AFM. The control station 220 may consist of a single integrated unit, or may consist of a distributed array of electronics and software. The control station may use a typical desktop computer, a laptop computer, an industrial computer and/or one or more embedded processors.

Probe 212 can also be actuated to move toward and away from sample 222 using actuator assembly or scanner 12. Scanner 12 may be controlled via feedback by control station 220. Moreover, though the scanner 12 is shown coupled to the probe 212, the scanner 12 or a portion of it may be employed to move sample 222 in two or more mutual orthogonal directions.

In operation, as the probe 212 is oscillated and brought into contact with sample 222, sample characteristics can be monitored by detecting changes in the oscillation of probe 212. In particular, a beam (not shown) is directed towards the backside of probe 212 which is then reflected towards a detector 226, such as a four quadrant photodetector. As the beam translates across the detector, appropriate signals are transmitted to control station 220 which processes the signals to determine changes in the oscillation of probe 212. Control station 220 typically generates control signals to maintain a constant force between the tip 216 and the sample, typically to maintain a setpoint characteristic of the oscillation of probe 212. For example, control station 220 is often used to maintain the oscillation amplitude at a setpoint value, $A_s$, to insure a generally constant force between the tip 216 and the sample. Alternatively, a setpoint phase or frequency may be used. A workstation is also provided that receives the collected data from the control station 220 and manipulates the data obtained during scanning to perform the point selection, curve fitting, and distance determining operations described above. That workstation may be the control station 220 itself, a separate on-board controller, a separate off-board controller, or any combination of the three. If the workstation is formed from a combination of two or more controllers, they are preferably connected to one another, e.g., by hardwiring or via an Ethernet connection.

Figure 2:
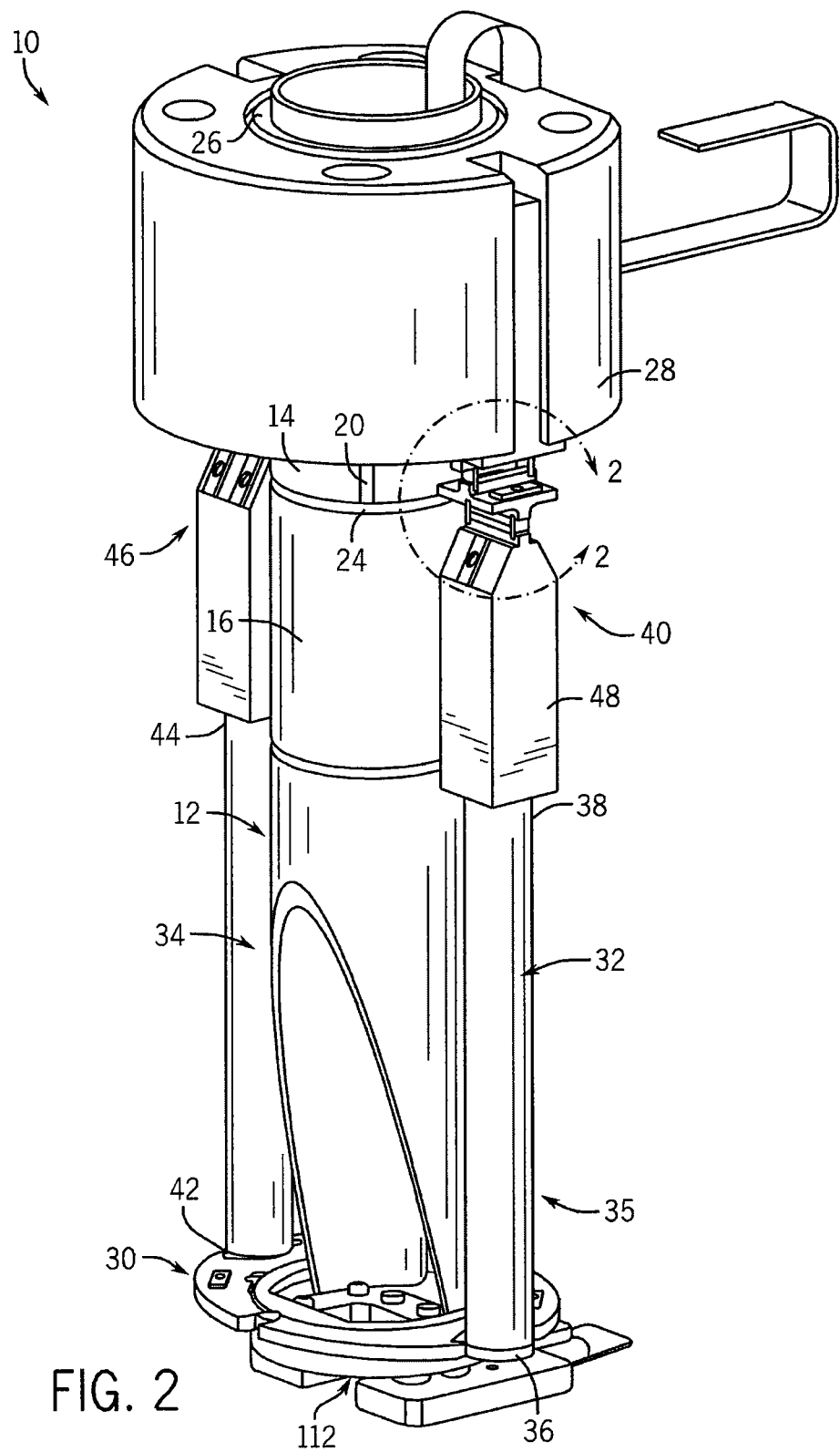
FIG. 2 is an isometric view of the scan head of the AFM of FIG. 1.

Turning now to FIG. 2, the scan head 10 includes the scanner 12 of the AFM 200 of FIG. 1 and a kinematic mounting arrangement 35 that is coupled to the scanner 12 and that supports sensors that monitor translating of the scanner 12. The scanner 12 may comprise any device that can be selectively supplied with an electric current to move the probe 212 in the X, Y, and Z directions in a controlled manner. It preferably comprises a piezoelectric actuator assembly such as piezoelectric stacks or, more preferably, a piezoelectric tube actuator assembly or simply a "tube scanner". Tube scanners offer the advantage of being mechanically simple and having superior dynamic performance but are more prone to bow and hysteresis than stack actuators. The sensor assembly described herein can be used to provide feedback to counteract those detrimental effects.

The piezoelectric tube actuator assembly forming the scanner 12 of this embodiment, which is typical for those currently used in AFMs, includes an upper actuator 14 and a lower actuator 16 mounted one beneath the other. The upper actuator 14 is mounted on a rigid mount or header 28 at its upper end and supports the lower actuator 16 on its lower end. It carries electrodes 20, 22 that cause displacement of the tube scanner 12 in the X-Y plane when a voltage is applied thereto. The actuator 14 may be used to position the probe 12 over a desired sample location for a measurement and/or may be controlled to scan the probe back and forth over the sample 22 in a raster pattern. It should be noted in this regard that references herein to the assembly 12 as a "scanner" or a "tube scanner" are for convenience only and should not be understood to mean that the probe must be caused to scan back and forth over a sample surface in operation.

The lower end of the actuator 16 forms the working end of the scanner 12 and, thus, supports the probe 212 on its bottom, working end. It carries electrodes 24 that, when energized, displace the working end of the scanner 12, and thus the probe 212, in the Z direction. In this regard, the probe 212 can be caused to move along the X and the Y axes by energizing the electrodes 20, 22 of the x-y actuator 14 and to move along movement along the Z axis by energizing the electrodes 24 of Z actuator 16. Thus, for purposes of this application, movement of the scanner 12 in the X and Y directions defines a scan plane generally parallel to the measured surface of the sample, and movement of the scanner 12 in the Z direction is substantially orthogonal to the scan plane.

Figure 5:
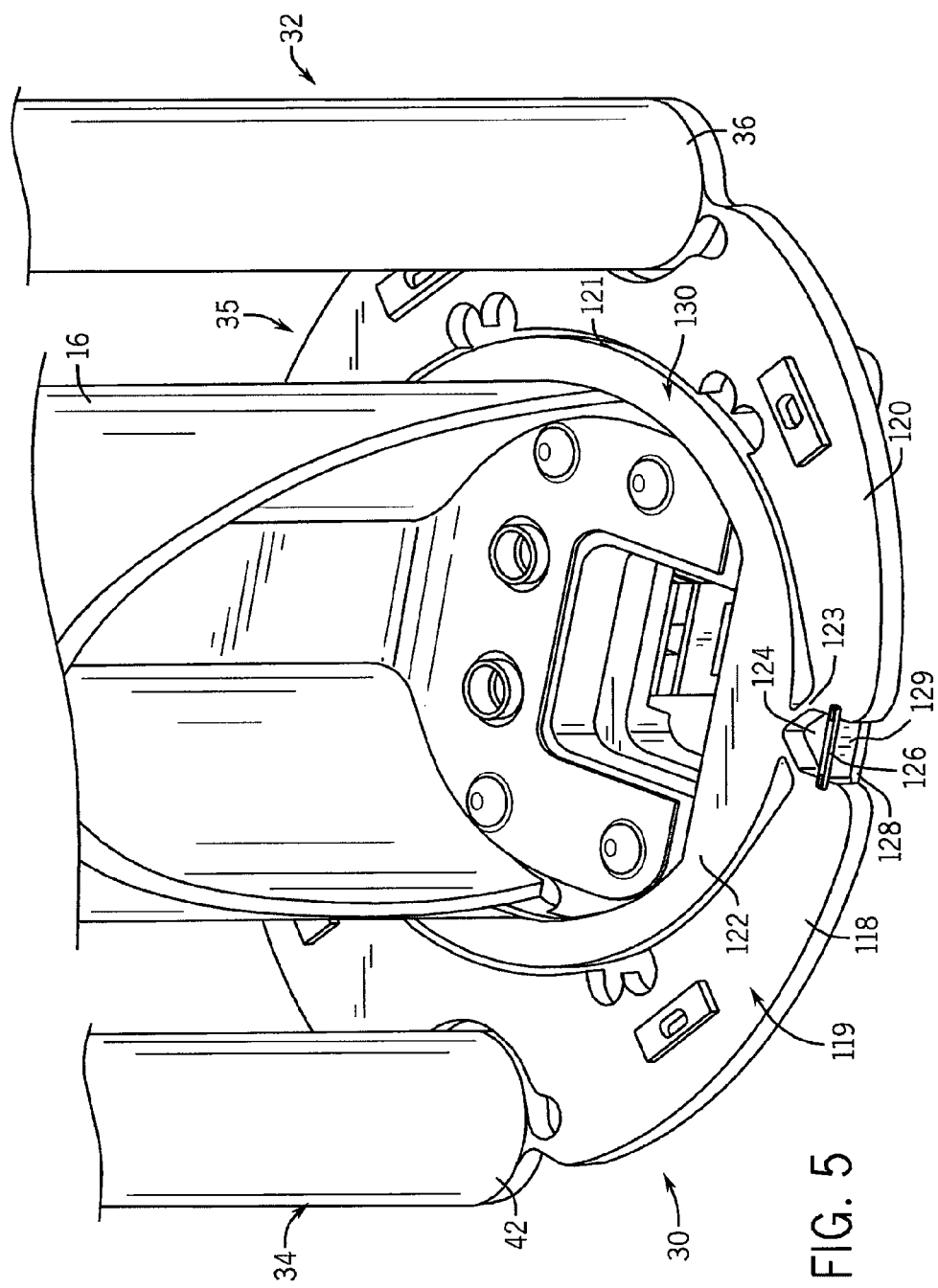
FIG. 5 is a top isometric view of a Z flexure module of the SPM of FIG. 2.

Referring particularly to FIG. 2, and as further illustrated in FIG. 5, kinematic sensor mounting arrangement 35 is coupled to the working end of the scanner 12 and translates motion of the scanner 12 in the X, Y, and Z directions into motions that are sensed by transducers. Sensor mounting arrangement 35 includes a base 30 that is coupled to the scanner 12, elongated rods 32, 34 that extend upwardly from base 30 and that are spaced from the tube scanner 12, and flexures that decouple motions in X, Y, and Z from one another and concentrate localized motion of portions of the arrangement 35 in the X, Y, and Z directions, respectively. Sensors directly monitor movement of those portions to obtain precise displacement measurements in the X, Y, and Z directions independently of one another. The sensors could, for example, be any of several optical displacement sensors (OSDs) such as ones using optical triangulation, shutter, or astigmatism principals. They could also comprise Linear Variable Displacement Transducers (LVDTs). However, strain gauge sensors are currently preferred. In addition to providing very precise position information, such sensors have the advantages of being relatively low cost, having low mass and therefore having negligible impact on the lowest fundamental resonant frequency of the tip scanner, and having small heat dissipation and therefore having negligible effect on scanner drift. The individual strain gauges may take any suitable form. They should have relatively high sensitivity through the desired range of actuator movement and relatively low noise. Semiconductor strain gauges are utilized in the present embodiment, but metal film strain gauges or alternative devices that change resistance as a function of strain could be used as well. Strain gauge sensors suitable for this purpose and their use in SPM scanners are disclosed, for example, in U.S. Pat. No. 5,641,897 and U.S. Published Application No. 2008/0011064, the subject matter of both of which are incorporated herein by reference.

Rod 32 of sensor mounting arrangement 35 has a lower end 36 that is connected to the base 30 and an upper end 38 that is connected to a first flexure module 40. Similarly, rod 34 has a lower end 42 that is connected to the base 30 and an upper end 44 that is connected to a second flexure module 46. While only flexure module 40 will be described, it is understood that flexure module 46 is similarly constructed.

Figure 3:
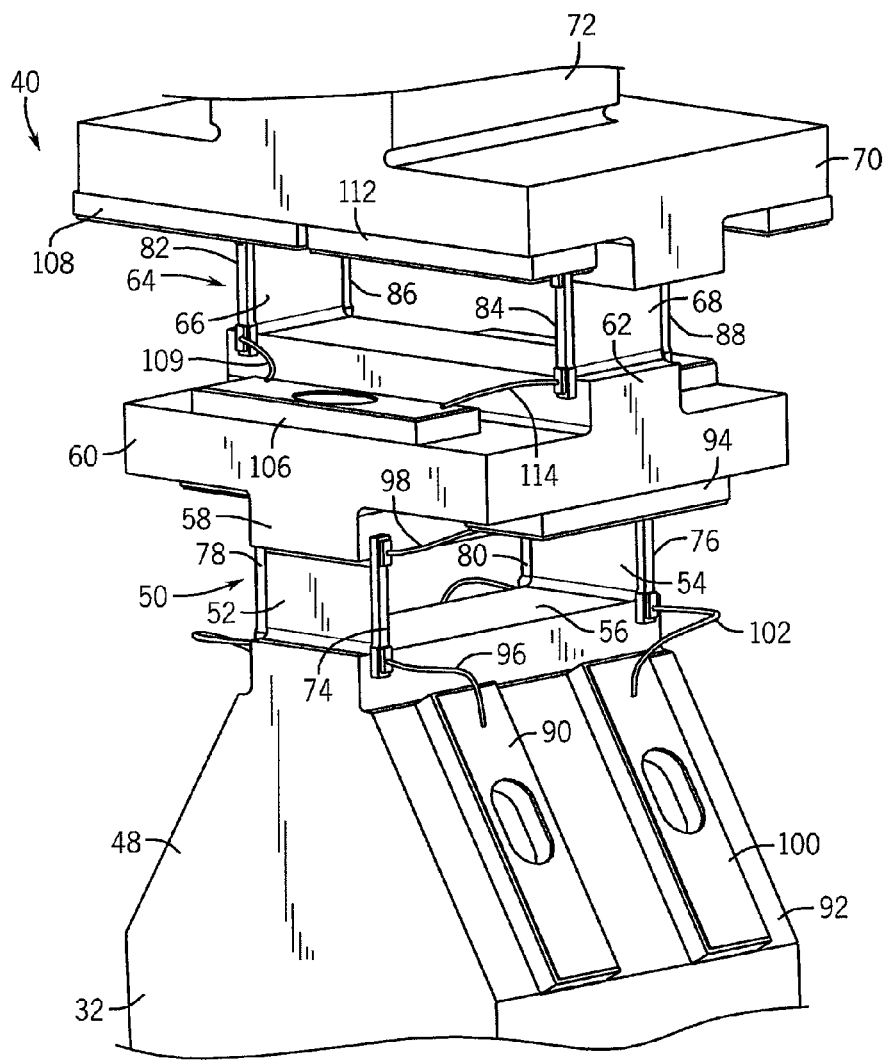
FIG. 3 is an isometric view of an X-Y flexure module of the SPM of FIG. 2.

With additional reference to FIG. 3, the flexure module 40 has a mounting block 48 connected to the upper end 38 of rod 32. A lower flexure 50 is coupled to, or otherwise formed with the mounting block 48, and generally comprises lower flexure members 52, 54 that extend in an upright manner from a top planar surface 56 of the mounting block 48. Thus, in effect, surface 56 forms a support for the lower flexure 50. The lower flexure members 52, 54 extend upward from surface 56 to an upper support 58 for the lower flexure 50. The upper support 58 is preferably integrally formed with a generally planar block 60 that includes a raised planar surface 62 to which an upper flexure 64 is coupled. The upper flexure 64 includes upper flexure members 66, 68 that extend upwardly from surface 62 to a header block 70 that is coupled to header 28 via leg 72. As shown in FIG. 2, the upper flexures 66, 68 are rotated 90 degrees relative to the orientation of the lower flexure members 52, 54.

The flexure elements 52, 54 of the lower flexure 50 or "lower flexure elements" are oriented to flex in the X direction in response to displacement of the rod 32 in the X direction upon energization of the X-Y tube 14 to move in the X direction. That movement is sensed by strain gauge sensors mounted on the lower flexure 50. More particularly, movement of the tube 12 in the X direction is experienced by the base 30 and is translated up the rod 32 to the lower flexure 50. The flexing of the lower flexure elements 52, 54 is transmitted across a series of X axis strain gauges 74, 76, 78, and 80. In a preferred embodiment, four strain gauges are used, with a pair of strain gauges mounted on opposite sides of the lower flexure members 52, 54. However, it is understood that fewer than four or more than four strain gauges may be used. It is preferred to use a pair of strain gauges on each face of a flexure member to compensate for temperature and other factors that may cause the strain readings by both strain gauges to be different even though the strain experienced by each strain gauge should be substantially the same. The upper flexure 64, which senses displacement of the rod 32, and thus tube scanner 12, in the Y direction, also preferably includes four strain gauges 82, 84, 86, and 88 mounted to opposite sides of the flexure members 66, 68. Hence, four strain gauges are provided for each of the X and Y axes.

Figure 4:
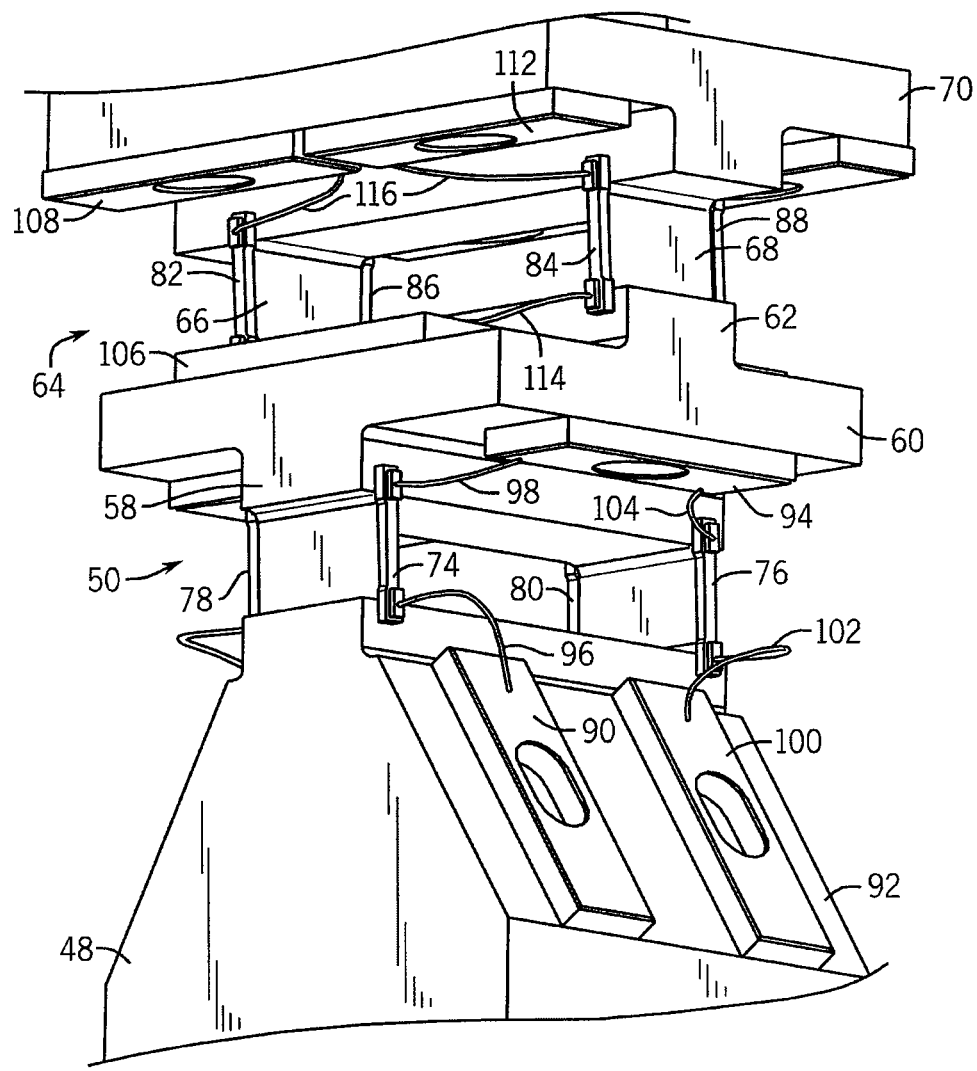
FIG. 4 a bottom isometric view of the X-Y flexure module of FIG. 3.

As shown in FIG. 4, strain gauge 74 is interconnected between a readout terminal 90, which is mounted to an angled exterior surface 92 of mounting block 48, and a terminal or bridging contact 94 that is mounted to an underside of block 60 for connecting strain gauge 74 with strain gauge 76. The strain gauge 74 is connected to terminal 90 by readout line 96 and is connected to bridging contact 94 by wire line 98. In a similar manner, strain gauge 76 is connected to terminal 100, which is also mounted to angled surface 92 of the mounting block 48, and is also connected to bridging contact 94. Strain gauge 76 is connected to its terminal 100 by readout line 102 and connects to bridging contact 94 by wire 104. Although not shown in the figures, it is understood that strain gauges 78, 80 are likewise connected to readout terminals by corresponding readout lines and are connected in series by a bridging contact. It will be appreciated that the use of bridging contacts allows two gauges to be used in series, e.g., gauge 74 and 76, rather than a single gauge. Strain gauge 82 is connected between terminal or bridging contact 106 that is mounted to a top surface of block 60 and readout terminal 108 that is mounted to an underside of header block 70. Strain gauge 82 is connected to the bridging contact 106 by line 109, as shown in FIG. 3, and is connected to readout terminal 108 by readout line 116. Similarly, strain gauge 84 is connected between bridging contact 106 that is mounted to a top surface of block 60 and readout terminal 112 that is mounted to an underside of header block 70. Strain gauge 84 is connected to bridging contact 106 by line 114 and is connected to readout terminal 112 by readout line 116. Although not shown in the figures, it is understood that strain gauges 86, 88 are likewise connected to readout terminals by corresponding readout lines. Hence, the Y-axis strain gauges, like the X-axis strain gauges, are provided in two sets of strain gauges, each of which contains two strain gauges arranged in series with one another. Using two gauges in series provides symmetry of the measurement profile and compensates for thermal coupling, as alluded to above. Moreover, by using four strain gauges for each of the x and y axes, this embodiment of the invention provides for a Wheatstone bridge measurement arrangement that is sensitive to strain but generally insensitive, or minimally sensitive, to temperature changes, vibrations, and other factors that could influence the strain measurements.

The position of the flexures and thus the strain gauge are selected such that flex associated with displacement of the tube 12 in the X direction is concentrated in the lower flexure 50. Similarly, the displacement of the tube 12 in the Y direction is concentrated in the upper flexure 64. In this regard, the stacked arrangement advantageously localizes X motion in the lower flexure 50 and localizes Y motion in the upper flexure 64. In addition, in a preferred embodiment, rod 34 is associated with flexures similar to those described with respect to rod 32. In this regard, eight separate stain measurements are taken for each movement in the X and Y directions. Additionally, each flexure is configured to resist out of plane motion while still providing relatively high compliance when in plane. Forces and motions in the X and Y directions thus are decoupled from one another, improving sensing accuracy.

As noted above, the tube scanner 12 is movable in all three substantially orthogonal axes. With additional reference to FIG. 5, the aforedescribed base 30 is comprised of outer and inner rings 119 and 130 affixed to the tube scanner 12 and the rods 32, 34 respectively. The rings 119 and 130 are separated by an annular opening 121 bridged by a flexure element 123 and in towards a pair of flexure plates or legs 118, 120 that are generally semi-circular in shape and that collectively define an opening 122 that receives lower stage 16 of the tube scanner 12. A gap 124 is defined between opposed ends of the flexure plates (it is understood that another gap, which is not shown in the drawings, is defined 180 degrees from gap 124) and the gap 124 is traversed by a pair of strain gauges 126, 128. The gap (not shown) opposite gap 124 is preferably bridged by a pair of strain gauges (not shown). Rod 32 is connected to and supported by flexure plate 120, and rod 34 is connected to and supported by flexure plate 122.

As mentioned briefly above, the base 30 also includes an inner ring 130 to which the tube scanner 12 is fixed and thus moves with the scanner 12 in the X, Y, and Z directions. Flexure elements 123 interconnect the inner ring 130 and the outer ring 119 and thus cause legs 118, 120 of the outer ring 119 to follow movement of the tube scanner 12. In this regard, movement of the inner ring 130 in the Z direction causes a corresponding twisting of flexure elements 123 and a bending of beam 129, which is interconnected between legs 118 and 120. That bending is detected by the strain gauges 126, 128, which are supported by beam 129. The middle portion of the respective legs 118, 120 follow the tube scanner in the X and Y directions but not in the Z direction because the rods 32, 34 are very stiff vertically, while the flexure modules 40, 46 allow the end of the scanner 12 to move in the X and Y directions. Therefore, the scanner 12 moves as a single unit in the X and Y directions, but the base 30 will bend when the tube scanner moves in the Z direction. This bending moment will be concentrated or localized at the weakest point of the base 30, which is beam 129 upon which the strain gauges 126, 128 are located. Notably, the Z flexure absorbs all movement of the scanner 12. The moving mass added to the tube scanner 12 by the sensor assembly and its mounts therefore is limited to the moving part of the Z flexure. The sensor assemblies' impact on tube Z bandwidth therefore is negligible. It is understood that the Z flexure includes an additional set of flexures, beams and strain gages disposed symmetrically about the scanner centerline.

Additionally, since the rods 32, 34 are coupled to respective flexure plates 120, 122, the rods 32, 34 will precisely follow the motion of the tube 12 in the X and Y directions. As a result, each rod, together with the end points of its flexure plate, effectively forms a tripod which kinematically locates the end of the rod. The rod therefore moves accurately in response to displacement of the tube, even at high frequencies. The bandwidth of the system is thereby increased.

The strain information obtained from the X, Y, and Z strain gauges is read out from the terminals and transmitted to control station 220 (FIG. 1) to obtain precise information regarding the actual position of end of the tube scanner 12 in X, Y, and Z. This information can, in turn, used for a variety of purposes including as feedback to the tube scanner 12 to compensate for non-linearities in scanning movement due to hysteresis, creep, and generally non-linear response of piezoelectric material. The arrangement of the strain gauges and their kinematic mounting structure permits displacement measurements with a bandwidth of 10 kHz or even higher. The decoupling of the strain gauges from the tube scanner 12 and of the flexure members from each other reduces noise to 1 nm or less. The use of strain gauges in the measurements also provides for very low power dissipation on the order of less than 10 mW It is understood that the present invention may also be used with a microscopy system having one or more sensors that sense displacement of the sample, and that the information regarding the displacement of the tube may be used in conjunction with the information regarding the displacement of the sample to calibrate image data acquisition or to provide real-time control of the movements of the probe during the image data acquisition process, such as the changing of a force curve measurement parameter during data acquisition using a FSPM, as described in U.S. Pat. No. 7,044,007, the disclosure of which is incorporate herein by reference.

Further, from the foregoing description, it will be appreciated that the preferred embodiment of the present invention provides a kinematic sensing frame or arrangement. In this regard, the preferred embodiment provides a sensing arrangement in which there is a single constraint for each degree of freedom, and the constraints are at least substantially orthogonal to one another. It is analogous to a rod and a hinge for each axis of motion. Rods are extremely stiff along their axis compared to the stiffness to bending. Providing hinges (e.g. flexures or ball-and-socket joints) at the ends of the rods relieves bending stress. This structure provides a number of advantages. For example, the kinematic sensing frame has a high rigidity and is relatively light weight, which improves scanner dynamics. In addition, strain is well-concentrated, which gives high sensitivity and, thus, high resolution and low noise for the strain gauge signals. The kinematic structure is very stable compared to systems that have two or more constraints combating or opposing one another. It therefore overcomes the thermal drift issues associated with over-constrained systems.

Additionally, it will be appreciated that the use of the term "orthogonal" herein refers to degrees of freedom or constraints that are not coupled to one another. For example, with a kinematic structure having an arrangement of orthogonal constraints, constraining movement, i.e., deflection, in one direction, such as along the X-axis, does not cause or constrain movement in another direction, such as along the Y-axis. In this regard, the term "orthogonal" as used herein is not limited to the special case in which the orthogonal axes are defined 90 degrees from one another. The directions in which the constraints act instead could be offset from one another more or less than 90 degrees.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

I claim:
1. A scanning probe microscope (SPM) comprising:
a scanner that is movable in an X-Y plane and that supports one of a probe and a sample support, the scanner including a piezoelectric tube assembly that is also movable in a Z direction that is perpendicular to the X-Y plane;

an X-axis sensor that is configured to sense displacement of the scanner in the X direction;
a Y-axis sensor that is configured to sense displacement of the scanner in the Y direction;
a Z-axis sensor that is configured to sense displacement of a portion of the scanner in the Z direction;
a mounting arrangement which is coupled to the scanner and on which the X-axis sensor, the Y-axis sensor, and the Z-Axis sensor are mounted in a spaced-apart relationship relative to the scanner, wherein the mounting arrangement includes X, Y, and Z axis flexures that mechanically decouple the X-axis sensor, the Y-axis sensor, and the Z-axis sensor from one another so that the X-axis sensor, the Y-axis sensor, and the Z-axis sensor sense motion essentially exclusively and independently in the X direction, the Y direction, and the Z-direction respectively.

2. The SPM of claim 1, further comprising a flexure module containing the X-axis flexure and the Y-axis flexure, and further comprising an elongate member extending from the Z-axis flexure to the flexure module.

3. The SPM of claim 2, further comprising a flexure support spaced from the Z-axis flexure, and wherein the flexure module has a first end coupled to the elongate member and a second end coupled to the flexure support.

4. The SPM of claim 1, wherein each of the sensors is a strain gauge sensor assembly.

5. A scanning probe microscope (SPM) comprising:
a scanner that is movable in an X-Y plan that supports one of a probe and a sample support;
an X-axis sensor that is configured to sense displacement of the scanner in the X direction;
a Y-axis sensor that is configured to sense displacement of the scanner in the Y direction; and
a mounting arrangement which is coupled to the scanner and on which the X-axis sensor and the Y-axis sensor are mounted in a spaced-apart relationship relative to the scanner, wherein the mounting arrangement includes flexures that mechanically decouple the X-axis sensor and the Y-axis sensor from one another so that the X-axis sensor and the Y-axis sensor sense motion essentially exclusively and independently in the X direction and the Y direction, respectively,
wherein the scanner comprises a piezoelectric tube assembly, wherein the piezoelectric tube assembly is also movable in a Z direction that is perpendicular to the X-Y plane, and further comprising a Z-axis sensor configured to sense displacement of the scanner in the Z direction, the Z-axis sensor being mounted on the mounting arrangement and being mechanically decoupled from the X-axis sensor and the Y-axis sensor so as to sense movement at least essentially exclusively and independently in the Z direction, wherein,
the flexure arrangement comprises an X-axis flexure, a Y-axis flexure, and a Z-axis flexure, and further comprising a flexure module containing the X-axis flexure and the Y-axis flexure, and further comprising an elongate member extending from the Z-axis flexure to the flexure module,
further comprising a flexure support spaced from the Z-axis flexure, and wherein the flexure module has a first end coupled to the elongate member and a second end coupled to the flexure support, and
wherein the first end includes a lower flexure support and the second end includes an upper flexure support, and wherein the X-axis sensor is mounted to the lower flexure support and the Y-axis sensor is mounted to the upper flexure support, and wherein the lower flexure support is offset 90 degrees from the upper flexure support.

6. A scanning probe microscope (SPM) comprising:
a scanner that is movable in an X-Y plan and that supports one of a probe and a sample support;
an X-axis sensor that is configured to sense displacement of the scanner in the X direction;
a Y-axis sensor that is configured to sense displacement of the scanner the Y direction; and
a mounting arrangement which is coupled to the scanner and on which the X-axis sensor and the Y-axis sensor are mounted in a spaced-apart relationship relative to the scanner, wherein the mounting arrangement includes flexures that mechanically decouple the X-axis sensor and the Y-axis sensor from one another so that the X-axis sensor and the Y-axis sensor sense motion essentially exclusively and independently in the X direction and the Y direction, respectively,
wherein the scanner comprises a piezoelectric tube assembly,
and further comprising 1) a Z-axis sensor configured to sense displacement of the scanner in the Z direction, and 2) a Z-axis flexure that-includes a first leg and a second leg that extend along opposed sides of the tube assembly in a spaced-apart relationship thereto, wherein each of the sensors includes a strain gauge assembly, and wherein the strain gauge assembly of the Z-axis sensor is connected between the first leg and the second leg.

7. A scanning probe microscope (SPM) for imaging an object, comprising:
a piezoelectric tube scanner that moves in mutually orthogonal X, Y, and Z directions in response to voltages applied to the piezoelectric tube scanner, the tube scanner having a working end on which one of a probe and a sample support is mounted;
a sensor mounting arrangement including
a base to which the working end of the piezoelectric tube scanner is coupled, the base flexing in response to displacement of the piezoelectric tube in the Z direction, and
a rod coupled to the base and extending upward from the base generally adjacent and spaced from the piezoelectric tube scanner, the rod flexing in response to displacement of the piezoelectric tube scanner in either the X or Y directions;
an arrangement of strain gauges including a first set of strain gauges that form a Z-axis sensor that measures displacement of the probe in the Z direction, a second set of strain gauges that measure displacement of the probe in the X direction, and a third set of strain gauges that measure displacement of the probe in the Y direction, wherein the first set of strain gauges is coupled to the base, and the second and third sets of strain gauges are coupled to the rod, and wherein the first, second, and third sets of strain gauges are mechanically decoupled from each other; and
a Z-axis flexure that includes a first leg and a second leg that extend along opposed sides of the piezoclectric tube scanner in a spaced-apart relationship thereto, and wherein the Z-axis sensor is connected between the first leg and the second leg.

8. The system of claim 7, further comprising a flexure module that mechanically decuples the first, second, and third sets of strain gauges from each other, wherein the flexure module includes the Z-axis flexure, an X-axis flexure and a Y-axis flexure, and wherein the second set of strain gauges are coupled to the X-axis flexure and the third set of strain gauges are coupled to the Y-axis flexure.

9. The system of claim 8, wherein the X-axis flexure and the Y axis flexure are stacked vertically with respect to one another so that X-axis motion of the tube scanner is concentrated in the X-axis flexure and Y-axis motion of the tube scanner is concentrated in the Y-axis flexure, 10. The system of claim 8, wherein the X-axis flexure and the Y-axis flexure are similarly constructed but arranged orthogonal to one another.

11. A scanning probe microscope (SPM) for imaging an object, comprising:
a piezoelectric tube scanner that moves in mutually orthogonal X, Y. and Z directions in response to voltages applied to the piezoelectric tube scanner, the tube scanner having a working end on which one of a probe and a sample support is mounted;
a sensor mounting arrangement including:
a base to which the working end of the piezoelectric tube scanner is coupled, the base flexing in response to displacement of the piezoelectric tube in the Z direction,
a rod coupled to the base and extending upward from the base generally adjacent and spaced from the piezoelectric tube scanner, the rod flexing in response to displacement of the piezoelectric tube scanner in either the X or Y directions;
an arrangement of strain gauges including a first set of strain gauges that measures displacement of the probe in the Z direction, a second set of strain gauges that measures displacement of the probe in the X direction, and a third set of strain gauges that measures displacement of the probe in the Y direction, wherein the first set of strain gauges is coupled to the base, and the second and third sets of strain gauges are coupled to the rod, and wherein the first, second, and third sets of strain gauges are mechanically decoupled from each other; and wherein
the base of the sensor mounting arrangement includes a first ring segment having first and second ends and a second ring segment having first and second ends, and wherein a first strain gauge of the first set of strain gauges is connected between the first ring segment and the second ring segment to bridge a first gap between the first end of the first ring segment and the first end of the second ring segment and wherein a second strain gauge of the first set of strain gauges is connected between the first ring segment and the second ring segment to bridge a second gap between the second end of the first ring segment and the second end of the second ring segment.

12. A scanning probe microscope (SPM) comprising:
a piezoelectric tube scanner movable in mutually orthogonal X, Y, and Z directions in response to applied voltages;
a kinematic mounting arrangement that is coupled to the tube scanner and that has first, second, and third flexures that mechanically decouple portions of the arrangement from one another to permit independent sensing of displacement of the tube scanner in each of the X, Y, and Z directions substantially without interference from movement of the tube scanner in any other directions; and wherein
the kinematic mounting arrangement includes a base to which a working end of the piezoelectric tube scanner is coupled, the base having a first ring segment and a second ring segment interconnected to one another by a pair of strain gauges that measure displacement of the piezoelectric tube scanner in the Z direction.

13. The SPM of claim 12, wherein the kinematic mounting arrangement further comprises a header spaced from the base and a rod extending upward from the base toward the header, and a flexure module interconnecting the rod and the header, and wherein the flexure module includes an X-axis flexure and a Y-axis flexure.

14. The SPM of claim 13, further comprising a pair of X-axis strain gauges coupled to the X-axis flexure that measure displacement of the piezoelectric tube scanner in the X direction, and a pair of Y-axis strain gauges coupled to the Y-axis flexure that measure displacement of the piezoelectric tube scanner in the Y direction.

15. The SPM of claim 14, wherein the kinematic flexure arrangement and the strain gauges are configured to measure displacement of the piezoelectric tube with a heat dissipation of less than 50 mW.

16. The SPM of claim 14, wherein the kinematic flexure arrangement and the strain gauges are configured to measure displacement of the piezoelectric tube with noise at a level below approximately 5 nm.

17. The SPM of claim 16, wherein the kinematic flexure arrangement and the strain gauges are configured to measure displacement of the piezoelectric tube with noise at a level below approximately 1 nm.

18. A method of operating a scanning probe microscope (SPM), comprising:
selectively energizing a piezoelectric tube scanner to translate a working end of the tube scanner in mutually orthogonal X, Y, and Z directions;
monitoring movement of the working end of the tube scanner using a sensor assembly that is mechanically decoupled from the piezoelectric tube scanner, the monitoring step including,
translating movement of the working end of the tube scanner into movement of a sensor mounting arrangement coupled thereto,
using X, Y, and Z axis flexures, concentrating movement of portions of the sensor mounting arrangement on which each of an X-axis sensor, a Y-axis sensor, and a Z-axis sensor are mounted to the X direction, the Y direction, and the Z direction, respectively, and
directly monitoring movement of the working end of tube scanner in the X, Y, and Z directions using the X-axis sensor, the Y-axis sensor, and the Z-axis sensor, respectively.

19. The method of claim 18, wherein the Z-axis flexure includes a first leg and a second leg that extend along opposed sides of the piezoelectric tube scanner in a spaced-apart relationship thereto, and wherein the Z-axis sensor is connected between the first leg and the second leg.

* * * * *